Patented Dec. 14, 1948

2,456,363

UNITED STATES PATENT OFFICE 2,456,363

BILE ACID DERIVATIVES AND PROCESS FOR THE MANUFACTURE OF SAME

Franz Bergel, Alexander Lang Morrison, Albert Ronald Moss, Marianne Königstein, and Heinrich Rinderknecht, Welwyn Garden City, England, assignors to Hoffmann-La Roche Inc., Nutley, N. J., a corporation of New Jersey No Drawing. Application January 18, 1946, Serial No. 642,106. In Great Britain January 24, 1945

15 Claims. (Cl. 260—239.5)

This invention relates to the manufacture of bile acid derivatives having valuable pharmaceutical properties.

Dehydrocholic acid has been used as a therapeutic agent either as the free acid or in the form of its sodium salt.

According to the present invention a process is provided for the manufacture of the hitherto unknown bile acid derivatives which are basic esters of keto-acids of the bile acid series of the general formula:

R—COO (CH$_2$)$_n$ NR$_1$R$_2$ where R—COO represents a keto-bile acid (such as dehydrocholic acid), $n$ stands for an integer greater than 1 and R$_1$ and R$_2$ represent alkyl groups, including the case where the N-atom forms part of a ring, such as the piperidino- or morpholino-groupings wherein a keto-acid of the bile acid series such as dehydrocholic acid or dehydrodesoxycholic acid is esterified with a dialkylaminoalkyl alcohol or halide (including, for example, piperidino-alkyl and morpholino-alkyl alcohols or halides).

Thus an alkali metal salt of the keto-acid may be treated with the appropriate halide, or the chloride of the keto-acid allowed to react with the alcohol or the free acid may be heated with a mixture of the alcohol and sulphuric acid or other esterification catalyst. The invention is intended to embrace all obvious chemical equivalents of any of the above mentioned procedures.

The following examples illustrate how the process of the invention may be carried into effect:

Example 1

Dehydrocholic acid (15 gms.) is added to thionyl chloride (20 ccs.) in benzene (200 ccs.) and the reaction mixture refluxed for 80 minutes until all the acid has dissolved. The excess thionyl chloride and benzene is evaporated under reduced pressure, and the residual dehydrocholic acid chloride crystallises on cooling. Diethylaminoethanol (80 ccs.) is then added slowly under ice cooling, the mixture heated for 10 minutes at 100° C. and left standing at room temperature for 1 hour. The reaction product is poured onto ice and sulphuric acid, any solid material filtered off, the filtrate made strongly alkaline to phenolphthalein with caustic soda solution, and then extracted with benzene; on addition of light petroleum diethylaminoethyl dehydrocholate crystallises out and recrystallisation from benzene and light petroleum yields the pure ester of M. Pt. 194–105° C.

Example 2

Dehydrocholic acid (1 gm.) in concentrated sulphuric acid (4.5 ccs.) is heated with diethylaminoethanol (25 ccs.) for 3 hours at 160° C. The cold reaction mixture is then poured onto ice and after filtering off insoluble material the filtrate is made alkaline to phenolphthalein with caustic soda solution and extracted with ether. Diethylaminoethyl dehydrocholate is obtained by distilling off the ether and crystallised from benzene and light petroleum. It has a M. Pt. of 194° C.

Example 3

Dehydrocholic acid (3 gms.) is added in portions to a solution of sodium (0.2 gm.) in absolute ethanol (80 ccs.). To the hot reaction mixture freshly prepared β-chlorethyldiethylamine (2.5 gms.) is added and refluxed for 10 minutes in a nitrogen atmosphere. The reaction product is poured onto ice, made strongly alkaline to phenolphthalein and extracted with benzene. The ester crystallises from benzene and light petroleum and has a M. Pt. of 194–195° C.

Example 4

Dehydrocholic acid (2 gms.) is added to a solution of sodium (0.2 gm.) in ethanol (25 ccs.). γ-Chlorpropyl diethylamine is added and the mixture refluxed for 4 hours in a nitrogen atmosphere. The cooled reaction product is poured onto ice and the solid diethylamino-propyl dehydrocholate precipitated is recrystallised from ethanol and has a constant M. Pt. of 181° C.

Example 5

Dehydrocholic acid (3.5 gms.) is added to a solution of sodium (0.4 gm.) in absolute ethanol (50 ccs.). Freshly prepared β-chlorethylpiperidine (5.5 gms.) is added and the mixture refluxed for 2 hours in a nitrogen atmosphere. The reaction product crystallises on cooling and is diluted with water. The crystalline solid consisting of β-piperidinoethyl dehydrocholate is filtered off and after recrystallisation from ethanol has a constant M. Pt. of 177° C.

Example 6

Dehydrocholic acid (2 gms.) is added to a solution of sodium (0.4 gm.) in ethanol (50 ccs.). β-Chlorethyl morpholine hydrochloride (3.5 gms.) is added and the mixture refluxed for one hour in an atmosphere of nitrogen. Two-thirds of the volume of ethanol is distilled off at 20 mms. pressure and the residual mixture poured onto ice. The precipitated product is dissolved in benzene. After distilling off most of the benzene, petroleum ether (B. Pt. 40–60° C.) is added when the β-morpholinoethyl dehydrocholate crystallises out. After two recrystallisations it has a constant M. Pt. of 183° C.

*Example 7*

Dehydrocholic acid (50 gms.) is added to a solution of sodium (3 gms.) in ethanol (500 ccs.). β-Chlorethyldiethylamine, freshly prepared from the corresponding hydrochloride (50 gms.) is added and the mixture refluxed for 30 minutes with mechanical stirring. The excess ethanol is then distilled off under reduced pressure and the solid residue dissolved in dilute hydrochloric acid (2000 ccs. of 0.06 n-hydrochloric acid). The acid solution which contains only a small amount of insoluble material is filtered through kieselguhr and the clean filtrate made alkaline with caustic soda (100 ccs. of 2 n-caustic soda), cooled in ice and the pure white solid filtered off. On crystallisation from acetone the diethylaminoethyl dehydrocholate melts at 200–201° C.

We claim:

1. A tertiary amino lower alkyl ester of dehydrocholic acid.
2. Dialkylaminoalkyl dehydrocholate, the alkyl radicals thereof being selected from lower saturated alkyls.
3. Aminoalkyl dehydrocholate, the alkyl radicals thereof being selected from lower saturated alkyls and the nitrogen atom thereof being a member of a ring containing less than 6 carbon atoms.
4. Dialkylaminoethyl dehydrocholate, the alkyl radicals thereof being selected from lower saturated alkyls.
5. Diethylaminoethyl dehydrocholate.
6. Dialkylaminopropyl dehydrocholate, the alkyl radicals thereof being selected from lower saturated alkyls.
7. Diethylaminopropyl dehydrocholate.
8. Aminoethyl dehydrocholate, the nitrogen atom thereof being a member of a ring containing less than 6 carbon atoms.
9. Morpholinylethyl dehydrocholate.
10. Process for the manufacture of dehydrocholic acid esters which comprises esterifying dehydrocholic acid with a tertiary amino lower alkyl alcohol.
11. Process for the manufacture of aminoalkyl dehydrocholate, comprising esterifying dehydrocholic acid with a tertiary amino lower alkyl alcohol, the alkyl radicals thereof being selected from lower saturated alkyls and the nitrogen atom thereof being a member of a ring containing less than 6 carbon atoms.
12. Process for the manufacture of diethylaminoethyl dehydrocholate, comprising esterifying dehydrocholic acid with diethylaminoethyl alcohol.
13. Process for the manufacture of diethylaminopropyl dehydrocholate, comprising esterifying dehydrocholic acid with diethylaminopropyl alcohol.
14. Process for the manufacture of aminoethyl dehydrocholate, comprising esterifying dehydrocholic acid with a tertiary aminoethyl alcohol, the nitrogen atom thereof being a member of a ring containing less than 6 carbon atoms.
15. Process for the manufacture of morpholinylethyl dehydrocholate, comprising esterifying dehydrocholic acid with morpholinylethyl alcohol.

FRANZ BERGEL.
ALEXANDER LANG MORRISON.
ALBERT RONALD MOSS.
MARIANNE KÖNIGSTEIN.
HEINRICH RINDERKNECHT.

REFERENCES CITED

The following references are of record in the file of this patent:

UNITED STATES PATENTS

| Number | Name | Date |
|---|---|---|
| 2,313,016 | Horenstein | Mar. 2, 1943 |